United States Patent [19]

Ryan et al.

[11] Patent Number: 4,547,888
[45] Date of Patent: Oct. 15, 1985

[54] RECURSIVE ADAPTIVE EQUALIZER FOR SMSK DATA LINKS

[75] Inventors: Carl R. Ryan, Gilbert, Ariz.; Allan R. Hambley, Atlantic Mine, Mich.

[73] Assignee: Motorola, Inc., Schaumburg, Ill.

[21] Appl. No.: 402,513

[22] Filed: Jul. 28, 1982

[51] Int. Cl.[4] .............................................. H04B 3/18
[52] U.S. Cl. ........................................ 375/14; 333/18; 375/101
[58] Field of Search ........................ 375/11, 12, 14, 16, 375/101; 364/718, 724; 333/18, 28; 328/155, 162; 178/69 R, 69 M

[56] References Cited

U.S. PATENT DOCUMENTS

| | | | |
|---|---|---|---|
| 3,715,670 | 2/1973 | Hirsch et al. | 375/14 |
| 3,974,449 | 8/1976 | Falconer | 375/14 |
| 4,080,580 | 3/1978 | Takasaki et al. | 333/28 R |
| 4,196,405 | 4/1980 | Dily et al. | 375/14 |
| 4,288,872 | 9/1981 | Tamburelli | 375/14 |
| 4,415,872 | 11/1983 | Karabinis | 375/14 |
| 4,476,491 | 10/1984 | Murata et al. | 375/14 |

Primary Examiner—Benedict V. Safourek
Attorney, Agent, or Firm—Eugene A. Parsons

[57] ABSTRACT

SMSK data link degradation in future and immediate past bits produced by carrier phase error and small errors in the sampling instant are reduced by a recursive adaptive equalizer having a feedforward stage with adjustable weight for each future bit to be corrected and a feedback stage with adjustable weight for each immediate past bit to be corrected. The weights are controlled by a controller which samples the output and adjusts each weight until the output is correct.

13 Claims, 3 Drawing Figures

RECURSIVE ADAPTIVE EQUALIZER FOR SMSK DATA LINKS

BACKGROUND OF THE INVENTION

Minimum shift keying (MSK) is an attractive modulation technique for digital communication systems incorporating hard limiting amplifiers in the channel. This is due to its constant envelope and compact spectral characteristics. In addition the MSK signal can be generated with simple hardware by a single data stream. The MSK signal can also be demodulated in serial fashion with simple hardware. This serial MSK (SMSK) is of particular interest because of the inherent advantages of the MSK modulation format and the simplicity of the hardware required. Digital communication systems can be significantly degraded by intersymbol interference caused by band limiting, filter misalignment, and multipath effects. Degradation due to intersymbol interference can often be effectively reduced by an equalizer filter.

SUMMARY OF THE INVENTION

The present invention pertains to a recursive adaptive equalizer for SMSK data links including a plurality of feedback loops each including at least one bit of delay and each adjustable in weight and polarity and a plurality of feed forward loops each including at least one bit of delay and each adjustable in weight and polarity.

The present invention further pertains to a recursive adaptive equalizer for SMSK data links wherein the adjustable weights are controlled by a microprocessor.

It is an object of the present invention to provide a new and improved equalizer filter for effectively reducing degradation due to intersymbol interference.

It is a further object of the present invention to provide a recursive adaptive equalizer for SMSK data links having at least one stage to reduce the effects of future bits and at least one stage to reduce the effects of past bits, each stage being controlled by a controller which samples the output and adjusts the weight of the stages to reduce intersymbol interference.

These and other objects of the invention will become apparent to those skilled in the art upon consideration of the accompanying specification, claims and drawings.

BRIEF DESCRIPTION OF THE DRAWINGS

Referring to the drawings.

DESCRIPTION OF THE PREFERRED EMBODIMENT

The output signal of an ideal SMSK system is given by:

$$r(t) \sum_{n=-\infty}^{\infty} d_n R(t - nT) \cos\left(\frac{2\pi(t - nT)}{4T} + \theta\right)$$

where $$R(t) = \left(1 - \frac{|t|}{2T}\right) \cos\frac{\pi t}{2T} + \frac{1}{\pi} \sin\frac{\pi |t|}{2T} \quad -2T < t < 2T$$
$$= 0$$

otherwise $d_n = \pm 1$ is the data sequence,

T is the bit link interval and $\theta$ is the carrier reference phase error.

When the carrier phase error, $\theta$, is zero, sampling the output signal at $t = kT$ results in the original data sequence, $d_k$. However when $\theta$ is not zero, intersymbol interference from the immediate past bit $d_{k-1}$ and future bit $d_{k+1}$ will occur. If sampling is done at $t = kT + \Delta t$ (where $\Delta t$ represents a small error in the sampling instant) intersymbol interference from two bits in the "future" or past can occur. If multipath, bandlimiting or misaligned filters are present in the system, intersymbol interference from bits farther in the past can be expected. Thus the sampled output of a SMSK communication link can be expected to be of the form:

$$r_k = a_2 d_{k+2} + a_1 d_{k+1} + a_0 d_k + a_{-1} d_{k-1} + a_{-2} d_{k-2} + a_{-3} d_{k-3}$$

where $a_0 d_k$ is the desired signal and $a_2 d_{K+2}, a_1 d_{k+1}, a_{-1} d_{k-1}$ etc. are intersymbol interference components from various sources. The intersymbol interference from past bits has been arbitrarily terminated at the third past bit but the system to be described could be easily expanded to accommodate more terms. Based on the nature of the intersymbol interference expected in a SMSK system the equalizer was selected to have the form shown in FIG. 1. Three feedback taps are incorporated to provide for cancellation of intersymbol interference from up to three past bits and two feedforward paths are provided to reduce intersymbol interference from future bits.

Figure 1:
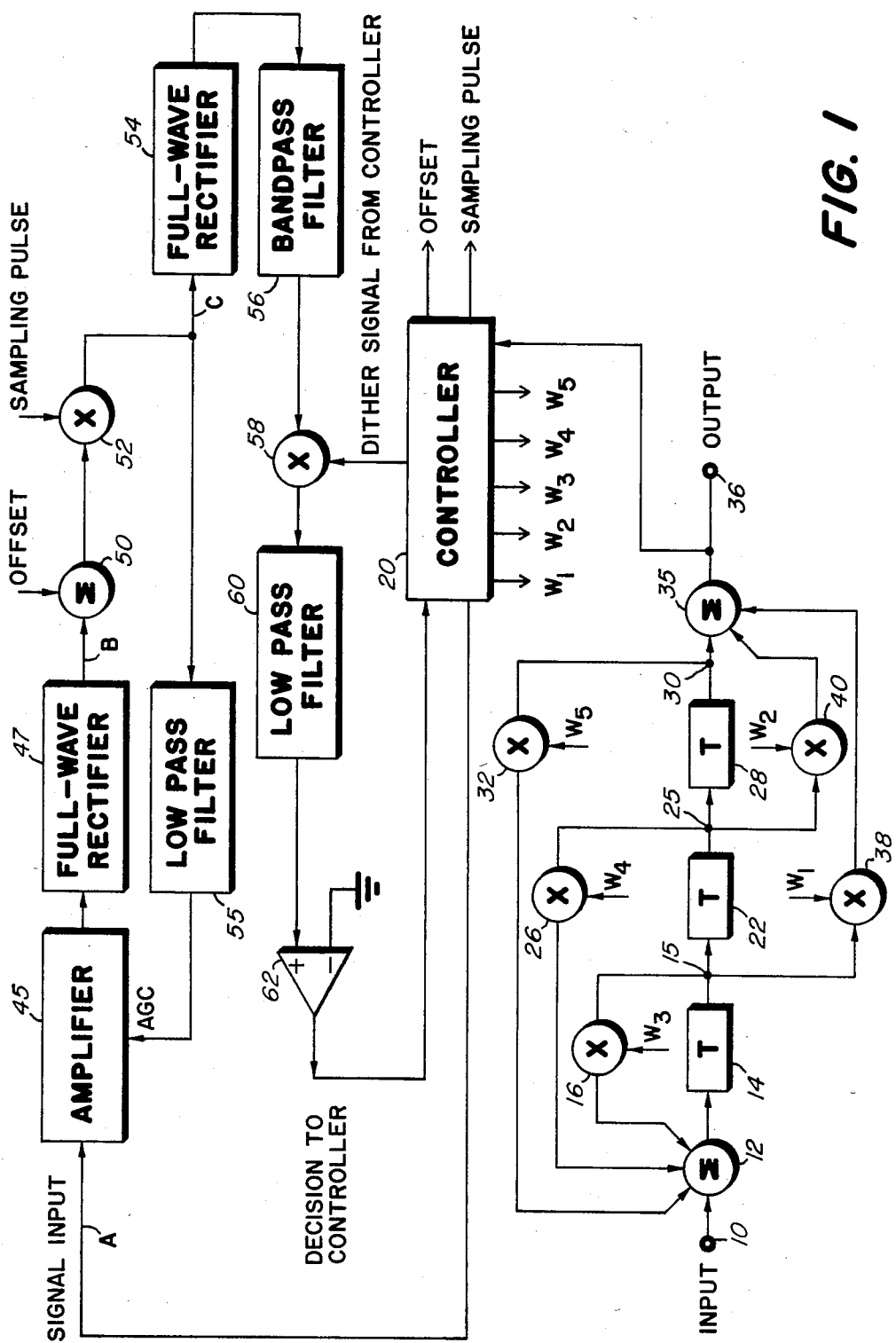
FIG. 1 is a block diagram of a recursive adaptive equalizer for SMSK data links embodying the present invention.

Referring specifically to FIG. 1, an input terminal 10 adapted to receive SMSK signals is connected to one input of a summation circuit 12. In this embodiment the summation circuit 12 has three other inputs and an output. The output of the summation circuit 12 is connected through a one bit delay 14 to a junction 15. The junction 15 is connected through a weighting device 16 to one of the inputs to the summation circuit 12. The weighting device 16 has a weight input, designated $W_3$, connected to the $W_3$ output of a controller 20. The weighting device 16 basically multiplies a weight and polarity adjusting signal on the weight input by the signal from the junction 15 to feedback the desired polarity and amplitude of signal. While the weighting device may be a simple multiplier circuit, many other types of circuits which provide the desired weight and polarity signal might be utilized. The feedback loop, including the delay 14 and the weighting device 16, is utilized to reduce errors in the SMSK signal from the immediate past bit.

The junction 15 is also connected through a second one bit delay 22 to a second junction 25. The junction 25 is connected through a weighting device 26 to another input of the summation circuit 12. The weighting device 26 has a weight input, designated $W_4$, connected to the $W_4$ output of the controller 20. The loop including the delay 22 and the weighting device 26 is designed to correct intersymbol interference caused by the second immediate past bit. The junction 25 is connected through a one bit delay 28 to a junction 30. The junction 30 is connected through a weighting device 32 to another input of the summation circuit 12. The weighting device 32 has a weight input, designated $W_5$, connected to the $W_5$ output of the controller 20. The loop including the delay 28 and the weighting device 32 is designed to correct intersymbol interference caused by the third past bit. The junction 30 is also connected to one input of a second summation circuit 35, the output of which is available at a terminal 36 and is the corrected SMSK signal at the output of the recursive adaptive equalizer.

The junction 15 is also connected through a weighting device 38 to another input of the summation circuit 35. The weighting device 38 has an input, designated $W_1$, connected to the $W_1$ output of the controller 20. The loop including the delay 22 and the weighting device 38 comprises a feedforward loop which corrects the intersymbol interference in the SMSK signal caused by the first future bit. The junction 25 is connected through a weighting device 40 to another input of the summation circuit 35. The weighting device 40 has a weight input, designated $W_2$, connected to the $W_2$ output of the controller 20. The feedforward loop including the delay 28 and the weighting device 40 is designed to correct intersymbol interference in the SMSK signal caused by the second future bit.

The signal at the output of the summation circuit 35 is also supplied to the controller 20. The controller 20 supplies the signal from the output of the summation circuit 35 to an AGC amplifier 45. The output of the amplifier 45 is supplied through a fullwave rectifier 47 to one input of a summation circuit 50. The summation circuit 50 also has an input connected to an offset output of the controller 20. The output signal from the summation circuit 50 is supplied through a multiplier 52 to the input of a fullwave rectifier 54. A second input of the multiplier 52 is received from a sampling pulse output of the controller 20. The output of the multiplier 52 is also supplied through a lowpass filter 55 to the control input of the AGC amplifier 45 to operate as an AGC signal. The output of the fullwave rectifier 54 is supplied through a bandpass filter 56 to one input of a multiplier 58. A second input of the multiplier 58 is connected to a dither signal output of the controller 20. The output of the multiplier 58 is supplied through a lowpass filter 60 to the positive input of a comparator 62. The negative input of the comparator 62 is connected to a reference potential, such as ground. The output of the comparator 62 is connected to an input of the controller 20.

The weighting signals, $W_1$ through $W_5$ are adjusted under the control of the controller 20 to minimize a measure of the intersymbol interference present in the output signal at the output of the summation circuit 35. The measurement is based on the fact that an ideally equalized signal will have an amplitude of $+A$ or $-A$ at the sampling instant, where A is constant for all sampling instants. When intersymbol interference is present, the amplitude of the signal will have a variable magnitude at the sampling instant.

Figure 2:
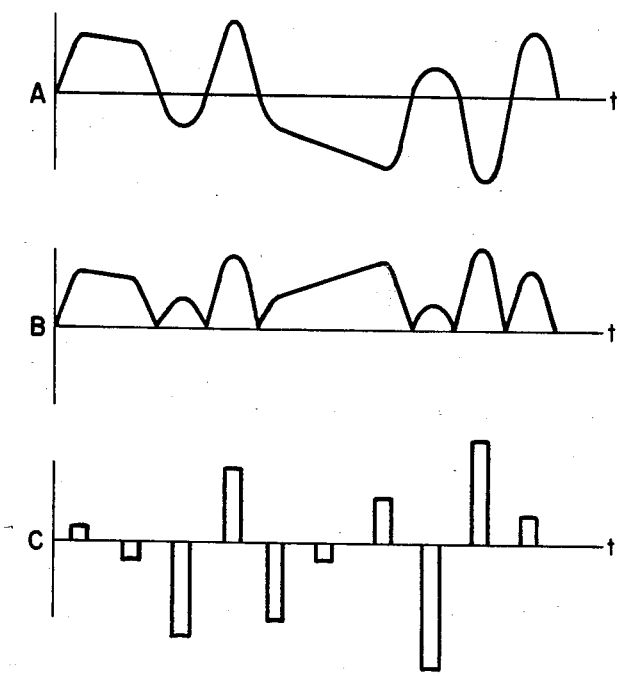
FIG. 2, A, B and C are typical waveforms available at various points in the block diagram of FIG. 1.

Operation of the system of FIG. 1 can be understood through examination of the waveform sketches in FIG. 2. An input waveform containing intersymbol interference is shown by waveform A of FIG. 2 and is illustrated as appearing at the input of the amplifier 45. The fullwave rectified signal at the output of the rectifier 47 is illustrated by waveform B of FIG. 2. A constant offset is subtracted from this waveform in the summation circuit 50 and the difference is multiplied by a sampling pulse, in the multiplier 52, resulting in the signal at point C shown by waveform C of FIG. 2. The constant offset is actually a DC voltage which may be supplied by the controller 20 but in this preferred design is produced simply by capacitively coupling the signal at point B to the multiplier 52. The action of the automatic gain control is to tend to produce a waveform with zero average value at point C. When intersymbol interference is present, the waveform at point C will contain a negative pulse if the input amplitude is reduced by the intersymbol interference or a positive pulse if the input amplitude is increased by the intersymbol interference at the sampling instant. When the input does not contain intersymbol interference the amplitude will be constant in magnitude at the sampling instant and no pulses of either polarity will occur at point C. The pulses at point C are then fullwave rectified in rectifier 54 and the signal resulting at the output thereof will have an average value which is a measure of the amount of intersymbol interference in the input signal.

The controller 20 selects each tap weight in turn for adjustment. The tap selected is periodically dithered up and down a small amount. The dithering results in a periodic fluctuation in the average value of the signal at the output of the fullwave rectifier 54. This fluctuation is filtered by the bandpass filter 56, which is centered on the frequency of the dither, and synchronously detected by the multiplier 58 with the reference dither signal supplied by the controller 20. The result is positive or negative depending on whether an increase in the weight signal causes an increase or a decrease in the intersymbol interference content of the signal at the output of the summation circuit 35. This signal is converted to a logic signal and returned to the controller 20 so a decision on whether to increase or decrease the weight signal selected can be made. Thus, in addition to supplying several periodic signals such as the offset, the sampling pulse and the dither signal, the controller basically timeshares the adjustment circuit among the five weight inputs. While a variety of well known switching circuits can be utilized for the controller 20, in the preferred embodiment a microprocessor is utilized to provide the desired functions.

Figure 3:
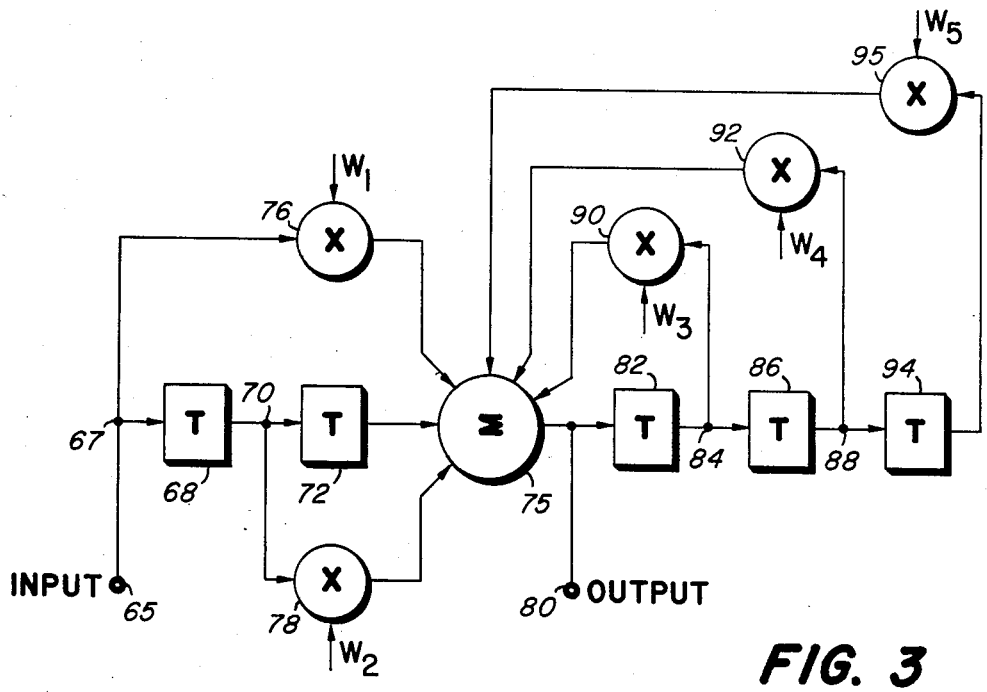
FIG. 3 is a block diagram of another embodiment of a recursive adaptive equalizer for SMSK data links embodying the present invention.

Referring specifically to FIG. 3, a slightly modified embodiment of the recursive adaptive equalizer is illustrated. The controller and adaptive adjustment circuit is not illustrated because this circuitry is the same as illustrated in FIG. 1. In the circuit of FIG. 3, an input terminal 65 is connected directly to a junction 67, which is in turn connected through a one bit delay 68 to a second junction 70. The junction 70 is connected through a one bit delay 72 to one input of a summation circuit 75. The junction 67 is connected through a weighting device 76 to another input of the summation circuit 75. The weighting device 76 has a weight input $W_1$ connected to the $W_1$ output of the controller, not shown. The junction 70 is connected through a weighting device 78 to another input of the summation circuit 75. The weighting device 78 has a weight input $W_2$ connected to the $W_2$ output of the controller. An output of the summation circuit 75 is connected directly to an output terminal 80 and through a one bit delay 82 to a junction 84. The junction 84 is connected through a one bit delay 86 to a junction 88. The junction 84 is connected through a weighting device 90 to another input of the summation circuit 75. The weighting device 90 has a weight input $W_3$ connected to the $W_3$ output of the controller. The junction 88 is connected through a weighting device 92 to another input of the summation circuit 75. The weighting device 92 has a weight input $W_4$ connected to the $W_4$ output of the controller. The junction 88 is also connected through a one bit delay 94 to the input of a weighting device 95. The output of the weighting device 95 is connected to another input of the summation circuit 75. The weighting device 95 also has a weight input $W_5$ connected to the $W_5$ output of the controller.

The feedforward loop including the delay 68 and the weighting device 76 is designed to reduce intersymbol interference from the first future bit while the feedforward loop including the delay 72 and the weighting device 78 is designed to reduce intersymbol interference from the second future bit. The three feedback loops including delay 82 and weighting device 90, delay 86 and weighting device 92, and delay 94 and weighting device 95, respectively, are designed to reduce intersymbol interference due to the first, second and third immediate past bits, respectively.

Thus, embodiments of a recursive adaptive equalizer for SMSK data links are disclosed, which substantially reduce intersymbol interference caused by band limiting, filter misalignment, and multipath effects and, therefore, make practical the use of SMSK as a modulation technique or digital communication systems. While we have shown and described specific embodiments of this invention, further modifications and improvements will occur to those skilled in the art. We desire it to be understood, therefore, that this invention is not limited to the particular forms shown and we intend in the appended claims to cover all modifications which do not depart from the spirit and scope of this invention.

We claim:

1. A recursive adaptive equalizer for SMSK data links comprising:
   a plurality of feedback loops each including at least one bit of delay and each adjustable in weight and polarity;
   a plurality of feedforward loops each including at least one bit of delay and each adjustable in weight and polarity;
   said plurality of feedback loops and said plurality of feedforward loops being coupled in series between an input and an output of the equalizer;
   a controller coupled to the feedback and feedforward loops for supplying weight and polarity adjusting signals to said feedback and feedforward loops and further coupled to receive a final output signal from said feedback and feedforward loops; and
   an intersymbol interference measurement circuit coupled to said controller for reducing the amount of intersymbol interference present in the final output signal, said intersymbol interference measurement circuit including an amplifier with an automatic gain control circuit coupled to receive the final output signal, a full wave rectifier coupled to the amplifier to full wave rectify output signals therefrom, a sampling circuit coupled to receive the full wave rectified output signal and provide periodic samples thereof, and circuitry coupled to said sampling circuit to receive the periodic samples and provide output signals to said controller.

2. A recursive adaptive equalizer as claimed in claim 1 wherein the circuitry coupled to said sampling circuit includes a second full wave rectifier coupled to full wave rectify the periodic samples from the sampling circuit, the output signal therefrom having an average valaue which is a measure of the amount of intersymbol interference in a received SMSK signal.

3. A recursive adaptive equalizer as claimed in claim 2 wherein the controller includes circuitry for periodically providing dithering signals in the weight and polarity adjusting signals supplied to each feedback and feedforward loop.

4. A recursive adaptive equalizer as claimed in claim 3 wherein the circuitry coupled to said sampling circuit further includes a bandpass filter approximately centered on the frequency of the dithering signal from the controller, said bandpass filter being coupled to the second full wave rectifier to filter the full wave rectified periodic samples therefrom, synchronous detecting means coupled to the bandpass filter and to receive the dithering signals from the controller for synchronously detecting the filtered periodic samples, and comparator means coupled to the synchronous detecting means for converting the detected samples to positive and negative signals indicative of a change in intersymbol interference produced by a change in a specified weight and polarity adjusting signal.

5. A recursive adaptive equalizer for SMSK data links comprising:
   a first summation circuit having a plurality of inputs, one of which operates as the equalizer input, and an output;
   a first one bit delay having an input connected to the output of said first summation circuit and an output;
   a first weighting device having an input connected to the output of said first one bit delay, an output connected to an input of said first summation circuit, and a weight input;
   a second summation circuit having a plurality of inputs and an output which operates as the equalizer output;
   a second one bit delay having an output connected to one input of said second summation circuit and an input coupled to the output of said first one bit delay; and
   a second weighting device having an input connected to the input of said second one bit delay, an output connected to an input of said second summation circuit, and a weight input;
   a controller coupled to the weight inputs of said first and second weighting devices for supplying weight and polarity adjusting signals to said weighting devices and further coupled to receive a final output signal from said weighting devices; and
   an intersymbol interference measurement circuit coupled to said controller for reducing the amount of intersymbol interference present in the final output signal, said intersymbol interference measurement circuit including an amplifier with an automatic gain control circuit coupled to receive the final output signal, a full wave rectifier coupled to the amplifier to full wave rectify output signals therefrom, a sampling circuit coupled to receive the full wave rectified output signal and provide periodic samples thereof, and circuitry coupled to said sampling circuit to receive the periodic samples and provide output signals to said controller.

6. A recursive adaptive equalizer as claimed in claim 5 wherein the first one bit delay output is coupled to the second one bit delay input by a third one bit delay and the equalizer further includes third, fourth and fifth weighting devices each having a weight input connected to receive third, fourth and fifth weight and polarity adjusting signals, said third device having an input connected to the output of said second one bit delay and an output connected to an input of the first summation circuit, said fourth device having an input connected to the output of said first one bit delay and an output connected to an input of the second summation circuit, and said fifth device having an input connected to the output of said third one bit delay and an output connected to an input of said first summation circuit.

7. A recursive adaptive equalizer as claimed in claim 5 wherein the weight and polarity adjusting signals are provided by a microprocessor.

8. A recursive adaptive equalizer as claimed in claim 7 including in addition an intersymbol interference measurement circuit coupled to the microprocessor for periodic adjustment of each of the weight and polarity adjusting signals.

9. A recursive adaptive equalizer as claimed in claim 5 wherein each of the weighting devices includes a multiplier.

10. A recursive adaptive equalizer for SMSK data links comprising:
a summation circuit having a plurality of inputs and an output;
a first one bit delay having an input coupled to an input of the equalizer and an output coupled to an input of said summation circuit;
a first weighting device having an input coupled to the input of said first one bit delay, an output connected to an input of said summation device, and a weight input;
a second one bit delay having an input coupled to the output of said summation circuit and an output;
a second weighting device having an input coupled to the output of said second one bit delay, an output connected to an input of said summation device, and a weight input;
a controller coupled to the weight inputs of said first and second weighting devices for supplying weight and polarity adjusting signals to said weighting devices and further coupled to receive a final output signal from said weighting devices; and
an intersymbol interference measurement circuit coupled to said controller for reducing the amount of intersymbol interference present in the final output signal, said intersymbol interference measurement circuit including an amplifier with an automatic gain control circuit coupled to receive the final output signal, a full wave rectifier coupled to the amplifier to full wave rectify output signals therefrom, a sampling circuit coupled to receive the full wave rectified output signal and provide periodic samples thereof, and circuitry coupled to said sampling circuit to receive the periodic samples and provide output signals to said controller.

11. A method of adjusting PSK signals to reduce intersymbol interference comprising the steps of:
receiving the PSK signal to be adjusted, mixing the received PSK signals with feedback signals, delaying the mixed signals to produce intermediate PSK signals and feeding a portion of the intermediate PSK signals back to use in the mixing step as the feedback signals;
delaying the intermediate PSK signals, feeding a portion of the intermediate PSK signals forward and mixing the delayed intermediate PSK signals with the fed-forward portion of the intermediate PSK signals to produce adjusted PSK signals;
determining the presence of intersymbol interference in the adjusted PSK signals including the steps of periodically testing the output signal for intersymbol interference by automatically controlling the gain of the output signal, full wave rectifying the gain controlled output signal, periodically sampling the full wave rectified signal, and full wave rectifying the periodic samples to provide a signal having an average value which is a measure of the amount of intersymbol interference; and
adjusting the portion of the intermediate PSK signals fed-back and the portion of the intermediate PSK signals fed-forward until intersymbol interference is substantially reduced in the adjusted PSK signals.

12. A method as claimed in claim 11 wherein the steps of determining and adjusting are performed on each portion periodically to determine the effect of adjusting each portion separately.

13. A method of adjusting PSK signals to reduce intersymbol interference comprising the steps of:
receiving the PSK signals to be adjusted, delaying the received PSK signals, feeding a portion of the received PSK signals forward and mixing the delayed PSK signals, the fed-forward portion of the received PSK signals and a feedback signal to produced adjusted PSK signals;
delaying the adjusted PSK signals and feeding a portion of the delayed adjusted PSK signals back to the mixing step as the feedback signal;
determining the presence of intersymbol interference in the adjusted PSK signals including the steps of periodically testing the output signal for intersymbol interference by automatically controlling the gain of the output signal, full wave rectifying the gain controlled output signal, periodically sampling the full wave rectified signal, and full wave rectifying the periodic samples to provide a signal having an average value which is a measure of the amount of intersymbol interference; and
adjusting the portion of the PSK signals fed-forward and the portion of the delayed adjusted PSK signals fed-back until intersymbol interference is substantially reduced in the adjusted PSK signals.

* * * * *